(12) United States Patent
Grigoryan et al.

(10) Patent No.: US 10,268,460 B2
(45) Date of Patent: Apr. 23, 2019

(54) SYSTEMS, METHOD, AND NON-TRANSITORY COMPUTER-READABLE STORAGE MEDIA FOR GENERATING CODE FOR DISPLAYING A WEBPAGE

(71) Applicant: Wal-Mart Stores, Inc., Bentonville, AR (US)

(72) Inventors: Alexander Grigoryan, San Jose, CA (US); Xiuhao Joel Chen, San Ramon, CA (US); Arpan Y. Nanavati, Castro Valley, CA (US); Caoyang Shi, San Jose, CA (US); David Andrew Stevens, Las Vegas, NV (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/415,661

(22) Filed: Jan. 25, 2017

(65) Prior Publication Data
US 2018/0210715 A1 Jul. 26, 2018

(51) Int. Cl.
*H04L 29/08* (2006.01)
*G06F 8/36* (2018.01)
*G06F 8/30* (2018.01)
*G06F 8/38* (2018.01)

(52) U.S. Cl.
CPC ............... *G06F 8/36* (2013.01); *G06F 8/31* (2013.01); *G06F 8/38* (2013.01); *H04L 67/02* (2013.01)

(58) Field of Classification Search
None
See application file for complete search history.

(56) References Cited

U.S. PATENT DOCUMENTS

| 6,654,784 B1 * | 11/2003 | Wei .......................... H04L 29/06 709/203 |
| 7,921,353 B1 * | 4/2011 | Murray ............. G06F 17/30893 707/722 |
| 8,245,125 B1 * | 8/2012 | Pupius .............. G06F 17/30899 715/208 |
| 8,719,451 B1 * | 5/2014 | Colton ................ G06F 17/3089 709/248 |
| 8,914,774 B1 | 12/2014 | Colton et al. |

(Continued)

*Primary Examiner* — Isaac T Tecklu
(74) *Attorney, Agent, or Firm* — Bryan Cave Leighton Paisner LLP

(57) ABSTRACT

A system for use in displaying a webpage is described herein. The system includes a web site hosting server and a monitoring server. The web site hosting server operates in a plurality of rendering modes including a server render mode and a client render mode. The server render mode includes retrieving server rendering application code associated with a webpage, generating rendered code, and transmitting the rendered code to a client computing device. The client render mode includes retrieving client rendering application code associated with the webpage and transmitting the client rendering application code to the client computing device including instructions to generate rendered code for use in displaying the webpage. The monitoring server is configured to determine a current performance level of the web site hosting server computer and transmit instructions to the web site hosting server to operate in the client render mode or the server render mode based on current performance levels.

17 Claims, 12 Drawing Sheets

(56) References Cited

U.S. PATENT DOCUMENTS

| | | | |
|---|---|---|---|
| 8,954,989 B1 | 2/2015 | Colton et al. | |
| 8,994,967 B1* | 3/2015 | Mayers | G06F 17/30964 358/1.13 |
| 9,122,650 B1 | 9/2015 | Colton et al. | |
| 9,223,599 B1* | 12/2015 | Racanelli | G06F 9/45512 |
| 9,602,574 B1* | 3/2017 | Mocanu | H04L 67/02 |
| 9,870,428 B2* | 1/2018 | Jellick | G06F 17/3089 |
| 9,900,369 B2* | 2/2018 | Afzal | H04L 67/02 |
| 2006/0048135 A1* | 3/2006 | Hodson | G06F 9/50 717/172 |
| 2006/0248166 A1* | 11/2006 | Milosevic | G06F 17/30905 709/219 |
| 2008/0184199 A1* | 7/2008 | Fried | G06F 9/451 717/115 |
| 2009/0287657 A1* | 11/2009 | Bennett | G06F 17/30867 |
| 2010/0269046 A1* | 10/2010 | Pahlavan | G06F 3/1462 715/740 |
| 2014/0181788 A1* | 6/2014 | Sullivan | G06F 9/451 717/109 |
| 2014/0281918 A1* | 9/2014 | Wei | H04L 67/02 715/234 |
| 2014/0289360 A1* | 9/2014 | Mahkovec | G06F 17/30899 709/217 |
| 2014/0297711 A1* | 10/2014 | He | G06F 17/2247 709/202 |
| 2014/0303934 A1* | 10/2014 | Mylarappa | G06F 11/3006 702/186 |
| 2014/0325337 A1* | 10/2014 | McWeeney | G06F 17/30893 715/234 |
| 2014/0344664 A1* | 11/2014 | Bleakley | G06F 17/212 715/234 |
| 2014/0344666 A1* | 11/2014 | Bleakley | G06F 17/212 715/234 |
| 2015/0046789 A1* | 2/2015 | Wei | G06F 17/2247 715/234 |
| 2015/0088968 A1* | 3/2015 | Wei | H04L 67/10 709/203 |
| 2015/0120804 A1* | 4/2015 | Eschbach | H04L 43/04 709/203 |
| 2016/0012111 A1* | 1/2016 | Pattabhiraman | G06F 17/30554 707/722 |
| 2016/0012144 A1* | 1/2016 | Benjamin | G06F 17/30896 715/234 |
| 2016/0012145 A1* | 1/2016 | Benjamin | G06F 17/2247 715/234 |
| 2016/0344832 A1* | 11/2016 | Kukreja | H04L 67/2833 |
| 2017/0169001 A1* | 6/2017 | D'Aurelio | G06F 17/2247 |
| 2017/0192799 A1* | 7/2017 | Wherry | G06F 9/4443 |
| 2017/0220306 A1* | 8/2017 | Price | G06F 3/0481 |
| 2017/0310791 A1* | 10/2017 | Palse | H04L 67/42 |
| 2017/0364485 A1* | 12/2017 | Kidambi | G06F 17/217 |
| 2018/0034721 A1* | 2/2018 | Dunn | H04L 43/50 |
| 2018/0088744 A1* | 3/2018 | Lin | G06F 3/0481 |
| 2018/0121401 A1* | 5/2018 | Wei | H04L 67/2804 |

* cited by examiner

Client rendering application code

SYSTEMS, METHOD, AND NON-TRANSITORY COMPUTER-READABLE STORAGE MEDIA FOR GENERATING CODE FOR DISPLAYING A WEBPAGE

FIELD OF THE DISCLOSURE

U.S. Patent Classification Primary Class: 707 (DATA PROCESSING: DATABASE, DATA MINING, AND FILE MANAGEMENT OR DATA STRUCTURES. Art Unit: 2161.

The present invention relates to software components, and more particularly, to systems, methods, and computer-readable storage media for use in displaying a webpage.

BACKGROUND

Many consumers desire to order items or goods remotely, e.g., on-line, through the Internet, or using a specially designed application or app on a personal computer or mobile device, such as a tablet or cell phone. At least some known website hosting systems include search engines that allow consumers to enter search criteria and generate search results based on the consumer's search criteria. Known search engines may generate and display product lists to consumers via a website including products that are selected based on the search criteria.

At least some known websites receive a significant number of monthly visitors with page loads up to 10,000 requests per second. In addition, at least some e-commerce websites add more than one million new items each month, which requires the development of new webpages and website capabilities to support user access to the additional items.

Developing new webpages and functionality to support the additional products and to utilize emerging user technologies presents significant challenges to organizations responsible for developing new websites and website functionality. Accordingly, it is desired to provide an improved computer server system that supports the development of software applications that are consistent, reliable, and follow the most scalable development practices, as well as support consistent webpage builds and deployments across projects.

The present invention is aimed at one or more of the problems identified above.

SUMMARY OF THE INVENTION

In different embodiments of the present invention, systems, methods, and computer-readable storage media implement a server computer system for displaying a webpage on a client computing device.

In one embodiment of the present invention, one or more non-transitory computer-readable storage media, having computer-executable instructions embodied thereon are provided. When executed by at least one processor, the computer-executable instructions cause the processor to operate as a website hosting server and a monitoring server. The website hosting server is configured to receive a request from a client computing device to display the webpage and transmit code to the client computing device for use in displaying the webpage. The website hosting server operates in a plurality of rendering modes including a server render mode and a client render mode. The server render mode includes retrieving server rendering application code associated with the webpage from a data library, executing the server rendering application code to initiate service calls to the data library to retrieve object data associated with the webpage, generating rendered code including the retrieved object data, and transmitting the rendered code to the client computing device. The client render mode includes retrieving client rendering application code associated with the webpage from the data library and transmitting the client rendering application code to the client computing device including instructions that cause the client computing device to generate rendered code for use in displaying the webpage. The monitoring server is configured to determine a current performance level of the website hosting server computer. The monitoring server transmits client render instructions to the website hosting server upon determining the current performance level is less than a predefined performance level. The client render instructions cause the website hosting server to operate in the client render mode. The monitoring server is also configured to transmit server render instructions to the website hosting server upon determining the current performance level is equal to the predefined performance level. The server render instructions cause the website hosting server computer to operate in server render mode.

In another embodiment of the present invention, a computer-implemented method for operating a server computer system for use in displaying a webpage on a client computing device is provided. The method includes a server computer performing the steps of receiving a request from a client computing device to display the webpage and transmitting code to the client computing device for use in displaying the webpage. The server computer operates in a plurality of rendering modes including a server render mode and a client render mode. The server computer operates in the server render mode including retrieving server rendering application code associated with the webpage from a data library, executing the server rendering application code to initiate service calls to the data library to retrieve object data associated with the webpage, generating rendered code including the retrieved object data, and transmitting the rendered code to the client computing device. The server computer operates in the client render mode including retrieving client rendering application code associated with the webpage from the data library and transmitting the client rendering application code to the client computing device including instructions that cause the client computing device to generate rendered code for use in displaying the webpage. The server computer determines a current performance level of the server computer, operates in the client render mode upon determining the current performance level is less than a predefined performance level, and operates in the server render mode upon determining the current performance level is equal to the predefined performance level.

In yet another embodiment of the present invention, a system for use in displaying a webpage is provided. The system includes a client computing device, a website hosting server, and a monitoring server. The client computing device includes a display device, a memory device, and a processor coupled to the memory device. The memory device including a web-browser program being stored therein. The processor is configured to execute the web-browser program to display a webpage on the display device. The website hosting server is configured to receive a request from the client computing device to display the webpage and transmit code to the client computing device for use in displaying the webpage. The website hosting server operates in a plurality of rendering modes including a server render mode and a client render mode. The server render mode includes retrieving server rendering application code associated with the webpage from a data library, executing the server rendering application code to initiate service calls to the data library to retrieve object data associated with the webpage, generating rendered code including the retrieved object data, and transmitting the rendered code to the client computing device. The client render mode includes retrieving client rendering application code associated with the webpage from the data library and transmitting the client rendering application code to the client computing device including instructions that cause the client computing device to generate rendered code for use in displaying the webpage. The monitoring server is configured to determine a current performance level of the website hosting server computer. The monitoring server is configured to transmit client render instructions to the website hosting server upon determining the current performance level is less than a predefined performance level. The client render instructions cause the website hosting server to operate in the client render mode. The monitoring server is also configured to transmit server render instructions to the website hosting server upon determining the current performance level is equal to the predefined performance level. The server render instructions cause the website hosting server computer to operate in server render mode.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Figure 1:
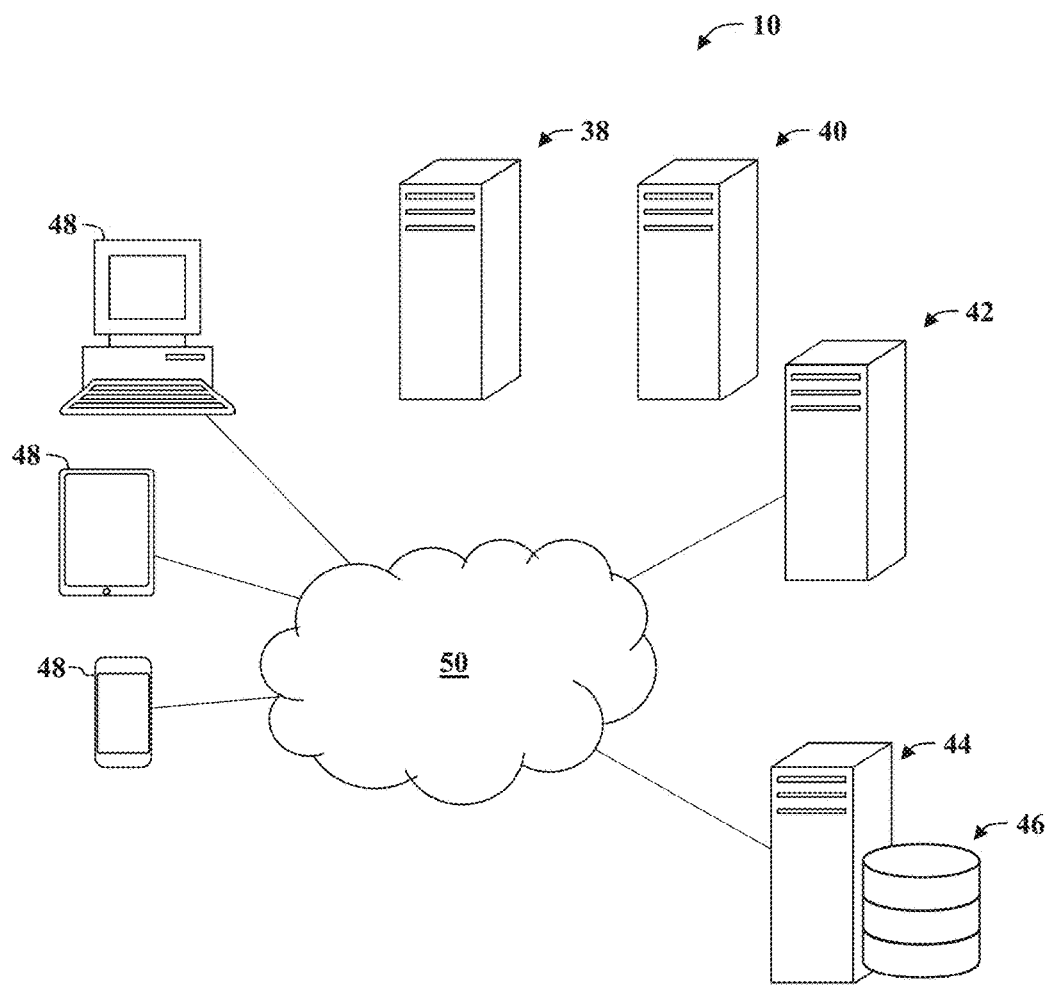
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the system 10 is configured to execute a software program, Electrode™, that is a platform for building universal React/Node.js applications with a standardized structure that follows best practices and has modern technologies baked in. The software program Electrode™ focuses on performance, component reusability and simple deployment to multiple cloud providers—so you can focus on what makes your app unique. Electrode™ enables the system to build a flexible and universal React/Node.js application, with support for server-side rendering and easy deployment. Use Electrode to start new projects quickly with a simple, consistent structure that follows modern best practices. The Electrode platform is managed by the Electrode Archetype System, which allows for a standardized configuration, structure and workflow throughout the entire application. By enforcing a sensible structure and consistency for components, modules and the entire app, Electrode's Archetype system helps you build scalable applications you can trust while ensuring streamlined development and deployment.

For example, Walmart.com™ at Scale: In the illustrated embodiment, 80 million monthly visitors, loads up to 10,000 requests per second, and 15 million items, adding more than one million new items each month is what Walmart.com's™ scale is all about. With a large e-commerce business, it is desired to scale Walmart.com™ and to leverage the talent and creativity of the engineering base.

Core Goals: In e-commerce development, platform migration is serious business. Technology evolves constantly and it's important to move and adapt to stay competitive. However, transforming an engineering organization is a completely different story. With over a few hundred engineers, and dozens of applications, a system including the Electrode™ platform was developed to solve core problems that every large scale organization faces including streamlined development cycles, structure and best practices, and software code reuse:

Streamlined Development Cycle—it is desired to have developers to on-board and start new projects quickly to realize the end goal of reduced time to market. When starting a new application, there are a lot of technologies and configurations that developers have to glue together (such as rendering on the server side, redux, webpack configs, css modules, post css, deployment scripts, internationalization, javascript/css linting, karma/mocha configs, code coverage configs, etc). To jump start new applications, it is desired to combine all of that in one easy to use package with a scalable structure that follows best practices. This way the Electrode™ system allows developers to focus their attention on building features that customers want.

Structure and Best Practices—With hundreds of engineers across dozens of teams, it is desired to ensure that all of the applications are consistent and reliable, and follow the most scalable development practices. It is also needed to focus results in consistent builds and deployments across projects, along with great scaffolding to start developers off on the right path. Electrode's™ predefined archetype system provides best practices and structures for building scalable applications that can be trust.

Code Reuse—Sharing React™ software components across projects and brands improves productivity—but only if developers can find the software components and trust their quality and consistency. Electrode's™ archetypes ensure consistent structure, and tools like Electrode Explorer™ make it easy to search through thousands of components to find what is needed.

Performance/Universal JavaScript—Server side rendering (SSR) makes a difference to performance and search engine optimization, so Electrode™ supports it out of the box. In addition, there is an opportunity to push the boundaries of performance even further, so Electrode™ was developed to include Caching and Profiling, Above the Fold Render, and Redux Router Engine.

One of the most frequently touted benefits of Facebook's React™ library is that its component model encourages code reuse. React™ is a JavaScript library for building user interfaces (UI). Declarative views make the code more predictable and easier to debug. React™ allows developers to build encapsulated software components that manage their own state, then compose those encapsulated software components to make complex UIs. Since component logic is written in JavaScript instead of templates, it can easily pass rich data through the application and keep state out of the DOM. A Simple Component, React™ components implement a render( ) method that takes input data and returns what to display.

Figure 6:
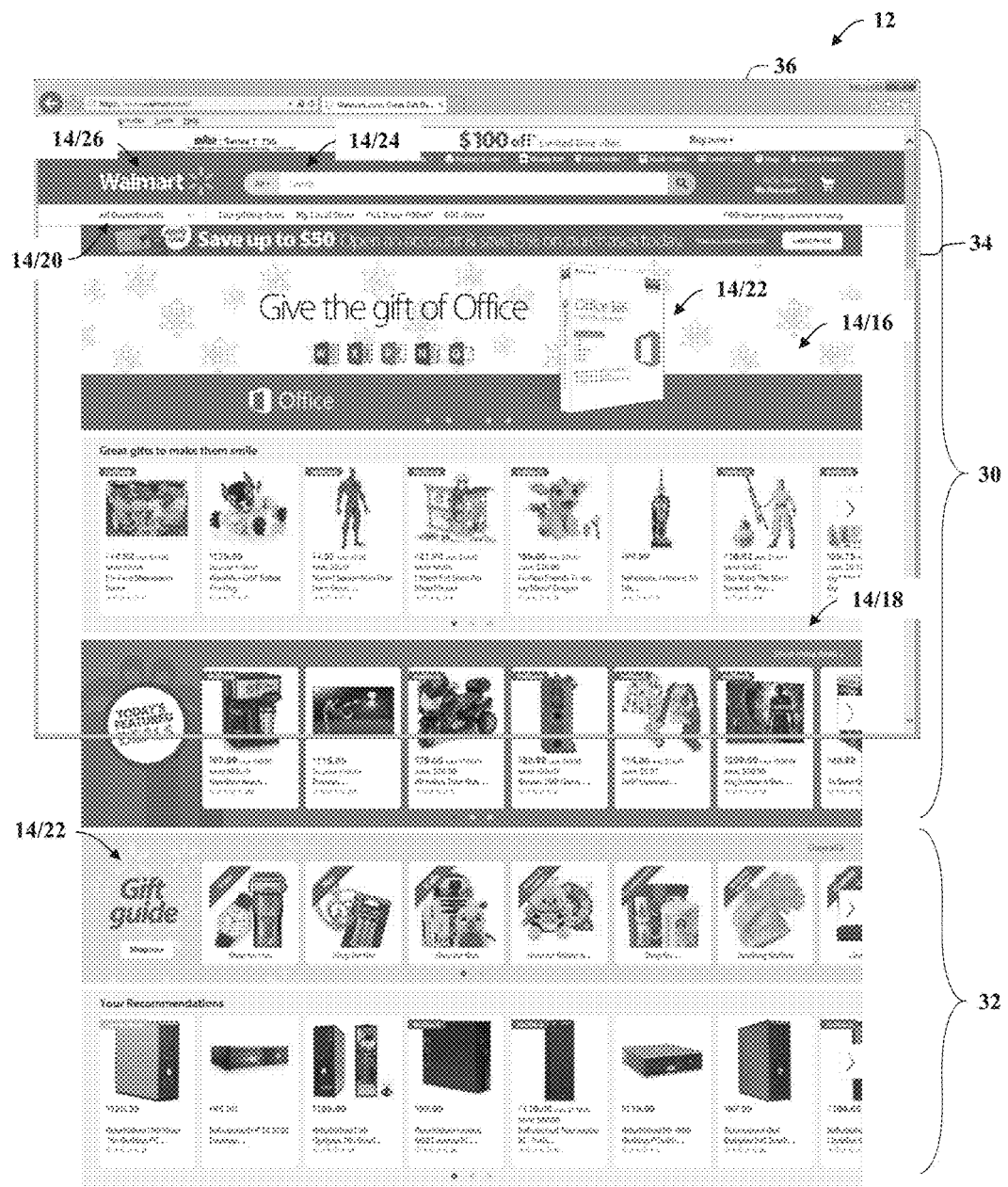
FIG. 6 is an illustration of an exemplary screenshot that may be generated by the system shown in FIGS. 1-2, according to embodiments of the present invention.
Figure 7:
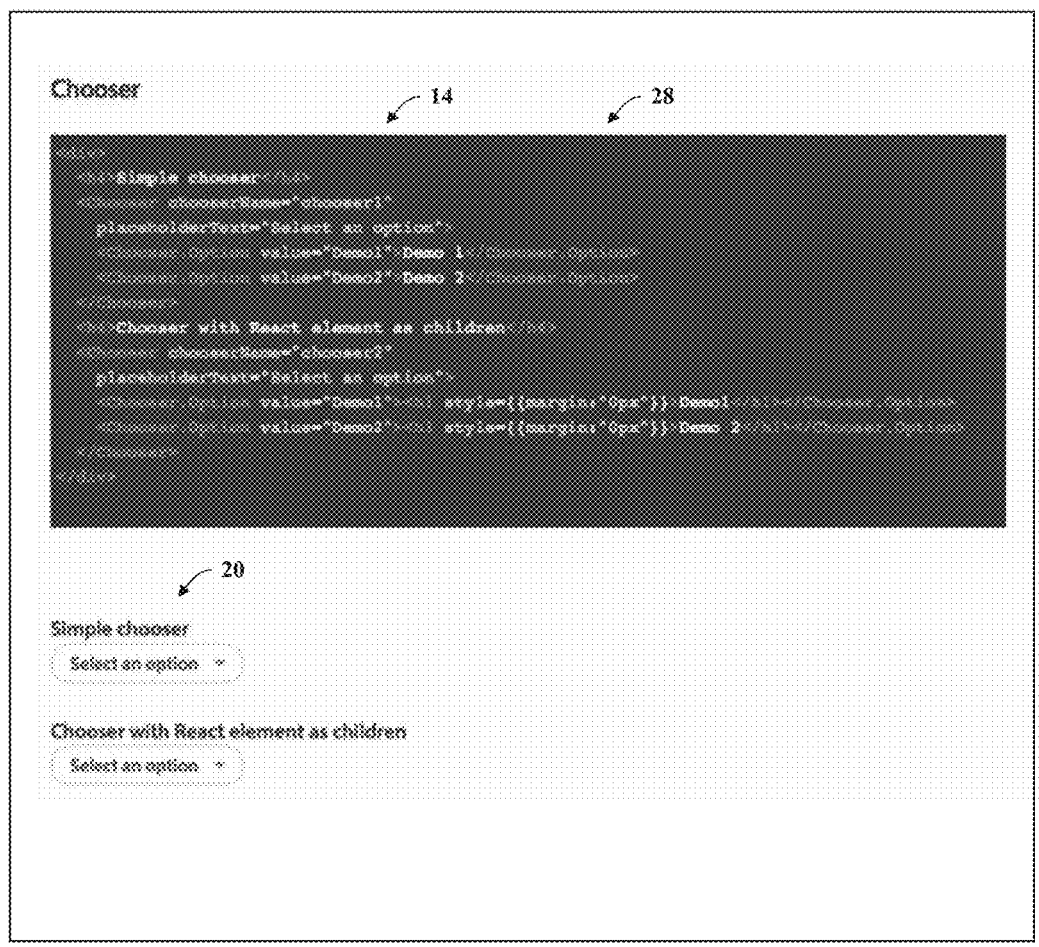
FIG. 7 is an illustration of exemplary software component computer code generated by the system shown in FIGS. 1-2, according to embodiments of the present invention.

On a large scale, this means sharing software components across applications—for example, using a software component that generates a login box on a standalone login page and on a checkout page. With reference to FIG. 6, in one embodiment, for example, the system 10 may be configured to generate and display a webpage 12 that is composed of a plurality of software components 14 for use in generating webpage elements such as, for example, product carousels 16 displaying images of products 18, a chooser menu 20 that enables a user to select product categories to refine a product search, a product display 22 that displays product information in response to a product search request, a search field 24 that allows a user to input search terms for use by the system 10 to search and display relevant product information, a logo frame 26 that displays a brand logo image, etc. When implemented well, this code reuse can result in faster development time and fewer bugs. For example, FIG. 7 illustrates an example of the React™ component code 28 that may be used to generate the chooser menu 20 being displayed with the webpage 12 shown in FIG. 6.

In addition, the system 10 may be configured generate and display the webpage 12 including a plurality of first webpage elements 30 and a plurality of second webpage elements 32. The plurality of first webpage elements 30 include those webpage elements and images that appear within an above-the-fold area 34 that appears when the webpage is initially displayed in a web-browser window 36 of a client computing device. The plurality of second webpage elements 32 include those webpage elements and images that may appear as the user scrolls through the webpage to view other areas of the webpage that are outside of the above-the-fold area 34 and not initially displayed by the web-browser program.

In the illustrated embodiment, the system 10 is configured to execute the Electrode™ software program to improve react server side render performance by up to 70% over known computer rendering programs. The Electrode™ software program includes a react/node.js application platform that powers walmart.com with several goals in mind, including ease of use, re-usability of components across applications and, most importantly, performance. In one embodiment, server side rendering includes a process where the initial request loads the page, layout, CSS, JavaScript and content. For subsequent updates to the page, the client-side rendering approach repeats the steps it used to get the initial content. The Electrode™ software program enables server side rendering two reasons: 1) Improved performance for the customer; and 2) Better for Search Engine Optimization.

In the illustrated embodiment, the system 10 also includes a server computer that is configured to operate in a plurality of rendering modes including a client render mode and a server render mode. When operating in a server render mode, the server computer may retrieve server rendering application code from a data library and execute a rendering operation including executing the component code 28 included in the sever rendering application code to identify the associated object data, initiate calls to services to one or more data libraries and/or business services to retrieve the object data, render HTML code string based on the instructions in the component code 28 and retrieved object data, and transmit the rendered HTML code string to the client device for use in displaying the webpage.

During operation in a client render mode, the server computer may retrieve client rendering application code from a data library and transmit the client rendering application code to the client device. In one embodiment, the client rendering application code includes the component code 28 and instructions which cause the client computing device to initiate a render operation to execute the client rendering application code including the component code 28 and initiate the calls to services to the server computer to receive the object data from the server computer for use in generating the rendered HTML code string. In another embodiment, during the client render mode, the server computer may initiate a partial-render operation including retrieving the client rendering application code from the data library and executing the client rendering application code to identify the associated object data. The server computer initiates the service calls to the data library to retrieve the identified object data and transmits the client rendering application code and the retrieved object data to the client computing device to enable the client device to generate the rendered HTML code string.

In the illustrated embodiment, the system 10 also includes a server monitoring module that monitors a performance of the server computer in handling webpage requests being received by the client computing devices. The server monitoring module enables the system 10 to monitor the performance of the server computer in real time to detect performance degradation or potential server computer failure. The server computer is configured to switch between the client render mode and the server render mode based on the monitored performance indicators. For example, when operating in server render mode, if the server monitoring module detects an overutilization of server computer resources caused by an increase in the number of webpage requests being received, the server computer may switch from server render mode to client render mode to reduce the computing resources being used by the server computer to render the HTML code, thus reducing the load on the server computer in supporting the website. In one embodiment, for example, the server computer may operate in server render mode to render the HTML code string that includes the first webpage elements 30 appearing within the above-the-fold area 34, and operate in client render mode and transmit client render application code to the client device to enable the client device to generate the HTML code for displaying the second webpage elements 32 that are outside of the above-the-fold area 34 and may appear as the user scrolls through the webpage.

In the illustrated embodiment, the system 10 includes a client render module that enables the server computer to operate in client render mode to partially render the component code 28 and transmit the partially rendered component code to the client computing device to enable the client computing device to complete the rendering operation to display and display the webpage to the user. For example, in one embodiment the client render module is configure to execute the component code 28 to initiate service calls to access object data associate with the web element based on the instructions include in the component code. The client render module may then transmit the component code and the object data to the client device including instructions to render the component code 28 and generate an HTML string using the object data to enable the client device to display the webpage. In the illustrated embodiment, the client render module enables the server computer to render software components on the server computer that are within the above-the-fold area 34 and the remaining components on the client device.

In one embodiment, the server computer includes a Redux Router Engine Module, which causes the server computer to copy the application code of the webpage during each subsequent request to modify the webpage. For example, in one embodiment, upon receiving a subsequent request to change of modify the webpage, such as for example, selecting a product 18 being displayed on the webpage or scrolling down to view additional items outside the initial above-the-fold area 34, the server computer may be configured to generate a copy of the current application code to maintain a current state of the webpage, identify a software component included in the application code based on the subsequent request and generate a copy of the identified software component. The server computer may then modify the copy of the software component based on the request to generate a modified copy of the identified software component. The server computer may then modify the copy of the application code to replace the identified software component with the modified copy of the software component to generate a modified copy of the application code. The server computer may also initiate a re-render operation including executing the modified copy of the application code to identify and retrieve object data from the data library, and generate rendered HTML code string from the modified copy of the application code.

Referring to FIG. 1, in the illustrated embodiment, the system 10 includes one or more website hosting servers 38, one or more business service servers 40, one or more monitoring servers 42, one or more software component database servers 44, one or more software component database libraries 46, and one or more client computing devices 48 that are each coupled in communication via a communications network 50. The communications network 50 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include one or more server computers that each include a processing device that includes a processor that is coupled to a memory device. The processing device executes various programs, and thereby controls components of the server according to user instructions received from the client computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in one or more databases, and retrieving information from the databases that is used by the processor to perform various functions described herein. The memory device may include, but is not limited to, a hard disc drive, an optical disc drive, and/or a flash memory drive. Further, the memory device may be distributed and located at multiple locations.

The client computing device 48 may include any suitable device that includes a display device configured to display websites to the user and a user input device, such as, for example, a keyboard and/or mouse, that enables a user to access and communicate with the system 10 including sending and/or receiving information to and from the system 10 and displaying information received from the system 10 to a user. The client computing device 48 may include a processing device that includes a processor that is coupled to a memory device. The processing device executes various programs, and thereby controls components of the client computing device 48 according to user instructions received via the user input device and/or server computers. For example, in one embodiment, the client computing device 48 may include, but is not limited to, a desktop computer, a laptop or notebook computer, a tablet computer, smartphone/tablet computer hybrid, a personal data assistant, a handheld mobile device including a cellular telephone, and the like. In addition, the client computing device 48 may include a touchscreen that operates as the display device and the user input device. In the illustrated embodiment, the client computing device 48 includes a web-browser program that is stored in the memory device. When executed by the processor of the client computing device, the web-browser program enables the client computing device to receive software code from the website hosting server 38 including, but not limited to HTML, JavaScript, cascade style sheets (CSS), and any suitable programming code that enables the client computing device 48 to generate and display a website and/or webpages on the display device of the client computing device. The web-browser program also enables the client computing device 48 to receive instructions from the website hosting server 38 that enable the client computing device 48 to render HTML code for use in generating and displaying portions of the website and/or webpage.

Each software component database server 44 includes a memory device that is connected to the software component database library 46 to retrieve and store information contained in the software component database library 46. The software component database library 46 contains information on a variety of matters, such as, for example, information associated with webpages associated with one or more websites, software components, application code, client rendering application code, server rendering application code, demonstration files, source code, integration code, object data, product images, product information, and/or any suitable information that enables the system 10 to function as described herein. The data and/or records contained in the software component database library 46 may include searchable data terms including characters, symbols, letters, numbers, words, phrases, images, text data files, video data files, image data files, audio data files, and the like.

Figure 12:
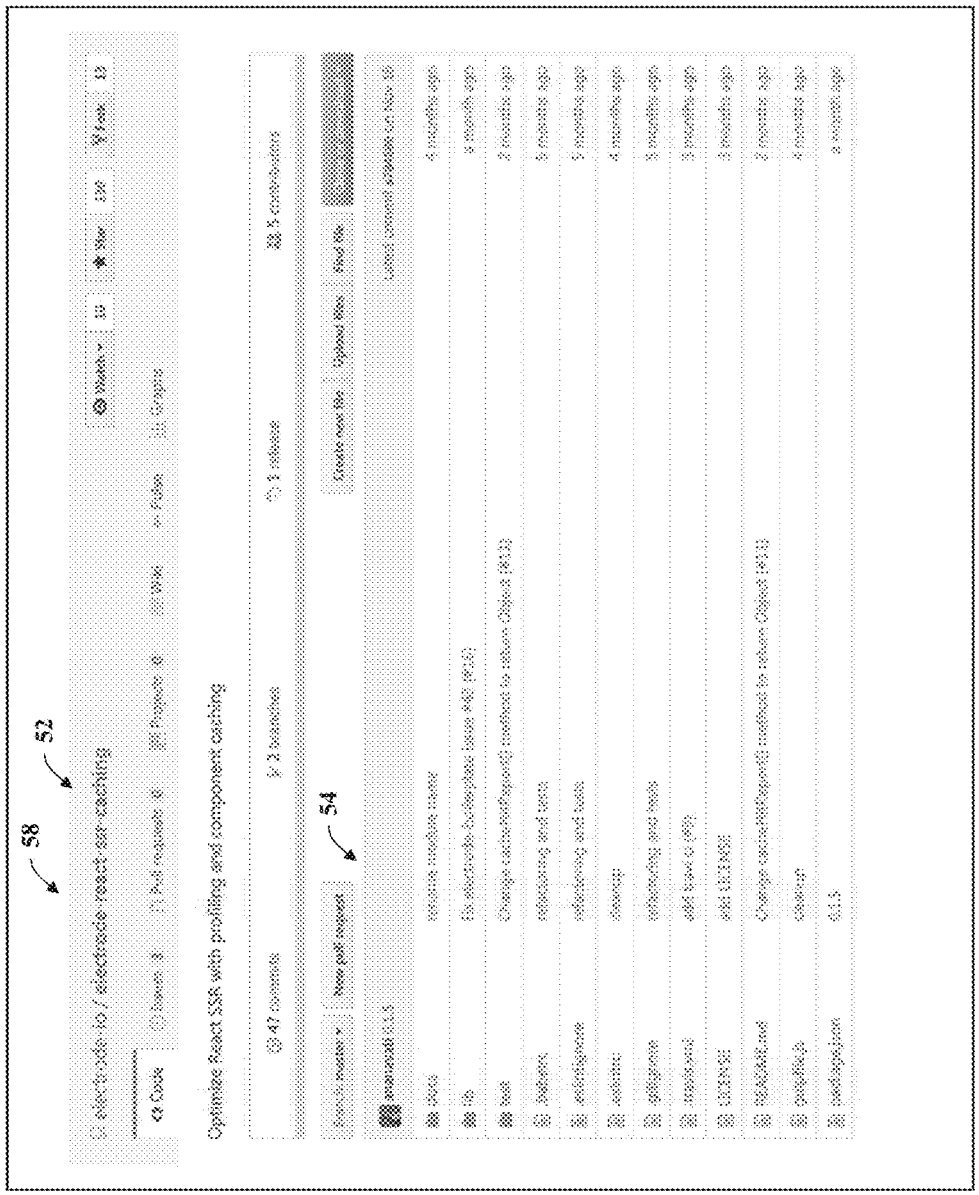
FIG. 12 is an illustration of an exemplary database record generated by the system shown in FIGS. 1-2, according to embodiments of the present invention.

For example, in one embodiment, the software component database library 46 may contain a plurality of data repositories 52 (shown in FIG. 12). Each data repository 52 includes one or more application data files 54 that includes application code 56 (shown in FIGS. 8A-8C and 9A-9D) associated with one or more webpages. Each software application data file 54 includes information associated with the corresponding application code 56 including, but not limited to, software component code (shown in FIG. 7), source code, integration code, object data associated with a corresponding software component, token values, look-up tables, and/or an application identifier 58 (shown in FIG. 12) such as, for example, a name, title, symbol, and/or any suitable unique identifier.

In one embodiment, the software component database library 46 stores application code 56 including server rendering application code 60 (shown in FIGS. 8A-8C) and client rendering application code 62 (show in FIGS. 9A-9D). The server rendering application code 60 and the client rendering application code 62 each include software component code 28 associated with web elements being displayed with the webpage 12. In the illustrated embodiment, the server rendering application code 60 includes instructions that cause the website hosting server 38 to operate in server render mode and rendering the software component 14 using the server computer in the server render mode. The client rendering application code 62 includes instructions that cause the website hosting server 38 to operate in client render mode and rendering the software components 14 using the client computing device 48. The client rendering application code 62 may also include instructions that cause the website hosting server 38 to operate in the partial-render mode.

Each website hosting server 38 is programmed to host a website including webpages 12 (shown in FIG. 6) that is accessible by a user via one or more client computing devices 48. The website hosting server 38 executes a website application program that retrieves application code being stored in the software component database library 46 and executes the application code including the software components to render one or more webpages on a display device of a client computing device 48 in response to requests received from the user via the client computing device 48 to allow users to interact with the website and search and/or purchase products such as, for example, goods and/or services via the website. The website hosting server 38 is configured to generate and display web pages associated with the website in response to requests being received from consumers via corresponding web browsers that are displayed on the client computing devices 48. For example, in one embodiment, the website hosting server 38 may host an e-commerce website and display a product search webpage 12 (shown in FIG. 6) in response to receiving a user request that allows a user to input a product search request including search criteria including one or more search terms and retrieve and display product information associated with one or more products 18 in response to the user's search request. The website hosting server 38 may also allow the user to select one or more of the displayed products for purchase.

Each business service server 40 is configured to perform operations to support the functions of the webpages and/or website being displayed by the website hosting server 38. For example, in one embodiment, the business service server 40 may include a point-of-sale (POS) system server that is configured to facilitate the purchase of goods and/or services by a consumer using an e-commerce website, an accounting server, a customer account server, and/or any suitable server computer configured to support the services being provided with the website.

In the illustrated embodiment, each application code 56 includes software component 14 having instructions for generating HTML code string that may be used to generate and display a website and/or webpage. For example, in one embodiment, upon receiving a request to display a webpage from a client computing device 48, the website hosting server 38 may access the software component database library 46, search one or more data repositories 52 and access the application code 56 to retrieve the software components 14 associated with the requested webpage. The website hosting server 38 may then operate in the server render mode to execute a render-to-string operation to generate rendered code, such as, for example HTML code, using the instructions included with each software component 14, and transmit the rendered code to the client computing device 48. For example, during the server render mode, the website hosting server 38 may retrieve server rendering application code 60 from the data library 46 and execute a rendering operation including executing the component code 28 included in the server rendering application code 60 to identify the associated object data. The website hosting server 38 then initiates calls to services to one or more data libraries 46 and/or business service servers 40 to retrieve the object data. The website hosting server 38 then renders HTML code string based on the instructions in the component code 28 and retrieved object data, and transmit the rendered HTML code string to the client computing device 48 for use in displaying the webpage. The web-browser program installed on the client computing device 48 executes the rendered code to generate and display webpage on the client computing device, including the webpage images and/or elements associated with software components 14.

In another embodiment, upon receiving a request to display the webpage 12 from a client computing device 48, the website hosting server 38 may operate in the client render mode and access the software component database library 46, search one or more data repositories 52 and access the client rendering application code 62 associated with the requested webpage 12. The website hosting server 38 may then transmit the client rendering application code 62 to the client computing device 48. The client rendering application code 62 includes instructions that cause the client computing device 48 to initiate a render operation and generate the rendered HTML code for use in displaying the webpage 12. For example, upon receiving the client rendering application code 62, the client computing device 48 may execute the client render application code 62 and transmit call to service requests to the website hosting server 38 requesting object data for use in generating the HTML code. In response to receiving the call to services request, the website hosting server 38 then initiates service calls to one or more data libraries 46 and/or business service servers 40 to retrieve the object data and transmits the object data to the client computing device 48. The client computing device 48 then uses the received object data to complete the rendering of the client rendering application code 62 and generates the rendered HTML code to display the webpage 12.

In one embodiment, the website hosting server 38 may initiate a partial-render operation in client render mode and execute the client rendering application code 62 prior to transmitting the code to the client computing device 48. During the partial-render operation, the website hosting server 38 executes the client rendering application code 62 to identify the object data associated with the webpage 12 and initiates the service calls to the data library 46 and/or business service servers 40 to retrieve the object data. The website hosting server 38 then transmits the object data and the client rendering application code 62 to the client computing device 48 which enables the client computing device 48 to initiate a render operation and generate rendered HTML code for use in displaying the webpage 12.

In one embodiment, the website hosting server 38 may be configured to initiate a mix-mode render operation in which the website hosting server 38 renders a portion of the webpage 12 and the client computing device 48 renders another portion of the webpage 12. For example, during the mix-mode render operation, upon receiving the request to display the webpage 12 from the client computing device 48, the website hosting server 38 may retrieve server rendering application code 60 that includes software component code 28 associated with the first webpage elements 30 being displayed in the above-the-fold area 34, and retrieve client rendering application code 62 that includes software component code 28 associated with second webpage elements 32 being displayed outside of the above-the-fold area 34. The website hosting server 38 then executes a server render operation to render HTML code for the first webpage elements 30 and transmits the rendered HTML code to the client computing device 48. In addition, the website hosting server 38 may also initiate the client render operation to transmit the client rendering application code 62 to the client computing device 48 with instructions that cause the client computing device 48 to generate the rendered HTML code for the second webpage elements 32.

The monitoring server 42 is configured to monitor the operation of the website hosting server 38 and operate the website hosting server 38 between the server render mode and the client render mode based upon the current performance of the website hosting server 38. For example, in one embodiment, the monitoring server 42 is configured to determine a current performance level of the website hosting server 38 and operate the website hosting server 38 in the client render mode if the current performance level is lower than a predefined performance level. The monitoring server 42 may also operate the website hosting server 38 in the server render mode when the current performance level is equal to, or greater than, the predefined performance levels.

For example, in one embodiment, the monitoring server 42 may be configured to transmit client render instructions to the website hosting server 38 upon determining the current performance level is less than a predefined performance level. The client render instructions cause the website hosting server 38 to operate in the client render mode. The monitoring server 42 may also be configured to transmit server render instructions to the website hosting server 38 upon determining the current performance level is equal to the predefined performance level. The server render instructions cause the website hosting server 38 to operate in server render mode.

In the illustrated embodiment, the monitoring server 42 is configured to monitor a plurality of performance indicators associated with the performance and operation of the website hosting server 38 in real time, and determine the current performance level of the website hosting server 38 as a function of at least one of the performance indicators. For example, the performance indicators may include, but are not limited to, the number of webpage requests being received, webpage uptime, CPU usage, CPU load, free disk space, and disk usage. In addition, the monitoring server 42 may be configured to monitor critical performance metrics including application pools, worker processes, cache requests and threads; sites, connections, files and requests; URI cache hits, memory usage, and current hits; site bindings; and/or processes and services.

Figure 2:
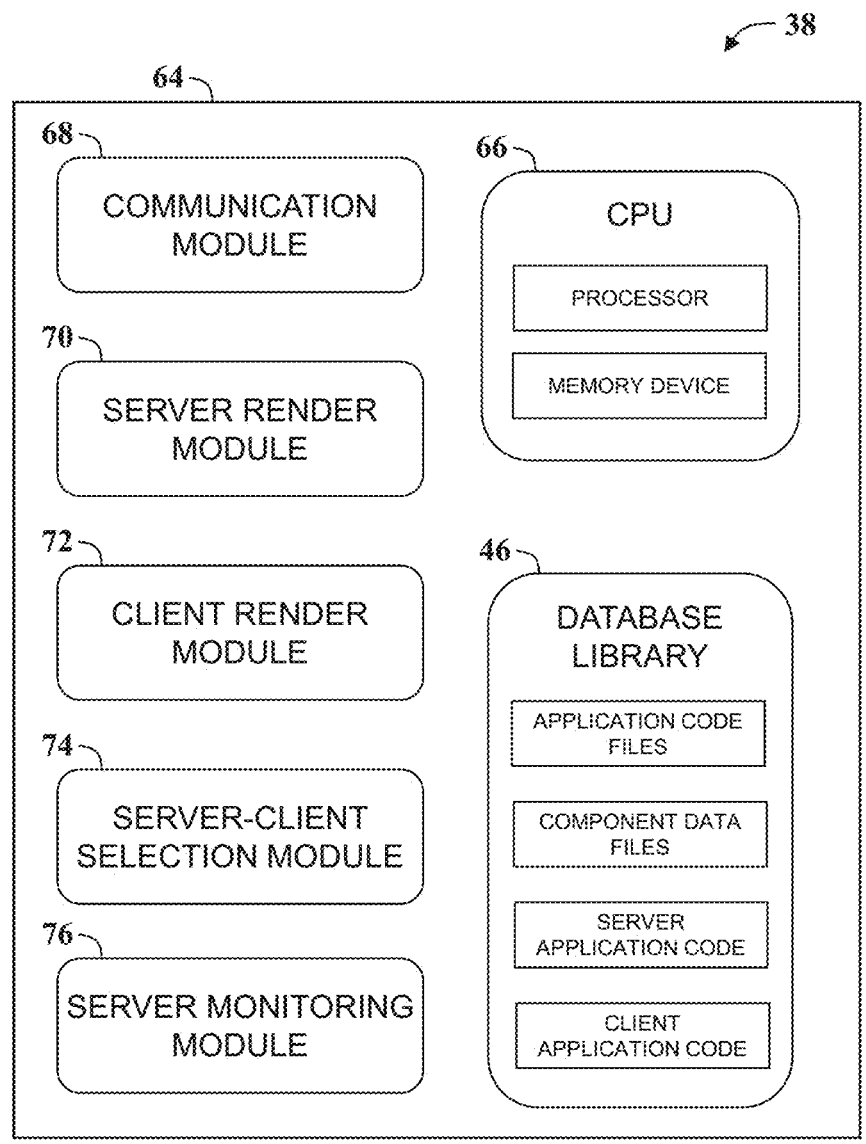
FIG. 2 is a schematic illustrating example components of a server computer that may be used with the system shown in FIG. 1, according to an embodiment of the present invention.

Referring to FIG. 2, in the illustrated embodiment, the website hosting server 38 includes a server computer 64 that includes a central processing unit (CPU) 66 that is coupled to the component database library 46, a communication module 68, a server render module 70, a client render module 72, and a server-client selection module 74. In one embodiment, the server computer 64 may include a server monitoring module 76 that is configured to perform the operations of the monitoring server 42. The CPU 66 includes one or more processors that are coupled to a memory device. In addition, the CPU 66 executes various programs, and thereby controls components of the server computer 64 according to user instructions received from the client computing devices 48 to enable users to interact with an operate the server computer 64. For example, in the illustrated embodiment, the processor is programmed to retrieve application code 56 being stored within the component database library 46 and execute the instructions included with the application code 56 and associated software components 14 to cause the processor to generate rendered code that may be transmitting to the client computing device 48 for use in generating and displaying a website and/or webpage on the client computing devices 48 using the web browser programmed installed on the client computing devices 48.

The communication module 68 retrieves various data and information from the component database library 46 that may be used by the website hosting server 38 in generating information that is associated with the software components 14 and sends information to the client computing device 48 via the communications network 50 to cause the client computing device 48 to display a website on the client computing device 48 to enable the user to access and interact with the system 10 via the website.

The server-client selection module 74 is programmed to transmit a request to the database server 44 to access each data repository 52 being stored in the software component database library 46 and retrieve application data files 54 including application code 56 associated with a requested webpage, and transmit the retrieved application code 56 including the software components 14 to the server render module 70 and/or the client render module 72. For example, in one embodiment, the server-client selection module 74 may receive a request from a client computing device 48 such as, for example, a Uniform Resource Locator (url) associated with a webpage being transmitted from a web browser program being executed by the client computing device 48, and access the component database library 46 to retrieve the application code 56 associated with the requested webpage 12. The server-client selection module 74 may then transmit the retrieved software components 14 to the server render module 70 and/or the client render module 72.

In the illustrated embodiment, the server-client selection module 74 is configured to operate the server computer 64 in a plurality of rendering modes including the server render mode and the client rendering mode based on current performance levels of the website hosting server 38 and/or the server computer 64. For example, the server-client selection module 74 is configure to receive performance indicators from the monitoring server 42 and/or the server monitoring module 76 and select an operational mode based on the monitored performance indicators. In one embodiment, the server-client selection module 74 is configured to operate the website hosting server 38 in the client render mode if the current performance level is lower than a predefined performance level, and operate the website hosting server 38 in the server render mode when the current performance level is equal to, or greater than, the predefined performance levels. The server-client selection module 74 may also be configured to alternate between the server render mode and the client rendering mode based on the real time performance indicators being received from the monitoring server 42 and/or the server monitoring module 76.

The server render module 70 is programmed to execute the server render operation including initiating a render-to-string operation to generate code that may be transmitted to the client computing device 48 for use by the web-browser program to display a website and/or webpage on the client computing device 48. For example, in one embodiment, upon receiving a request to display a webpage from the client computing device 48, server-client selection module 74 may transmit instructions to the server render module 70 to access the database library 46 and identify and retrieve server rendering application code 60 associated with the webpage 12. The server render module 70 executes the server render operation including a render-to-string operation and executes the server rendering application code 60. The instructions included in the server rendering application code 60 cause the server render module 70 to identify the retrieve the software components 14 associated with the webpage 12, identify the associated object data, and initiate calls to services to the data library 46 and/or business service server 40 to retrieve the object data. The server render module 70 then executes the render-to-string operation to generate rendered HTML code string based on the instructions in the server render application code and the retrieved object data. The communication module 68 may then transmits the rendered HTML code string to the client computing device 48 for use in displaying the webpage.

In the illustrated embodiment, the server render module 70 is configured to operate the server render mode including retrieving server rendering application code 60 associated with the webpage from a data library 46, executing the server rendering application code 60 to initiate service calls to the data library 46 and/or business service servers 40 to retrieve object data associated with the webpage 12, generating rendered code including the retrieved object data, and transmitting the rendered code to the client computing device 48. In addition, the server render module 70 is configured to operate in the server render mode including executing the render-to-string operation to generate rendered HTML code and transmit the rendered HTML code to the client computing device 48 for use in displaying the webpage 12.

The client render module 72 is configured to operate in the client render mode to retrieve client rendering application code 62 from the data library 46 and transmit the client rendering application code to the client device. For example, in one embodiment, upon receiving a request to display a webpage from the client computing device 48, the server-client selection module 74 may transmit instructions to the client render module 72 to access the database library 46 and identify and retrieve client rendering application code 62 associated with the webpage 12. The client render module 72 may then transmit the client rendering application code 62 to the client computing device 48 including instructions that cause the client computing device 48 to generate rendered code for use in displaying the webpage 12.

For example, in one embodiment, the client computing device 48 may execute the client rendering application code 62 and transmit a call to services request. The client render module 72 is configured to receive the call to services request from the client computing device 48, initiate service calls to the data library 46 and/or business service servers 40 upon receiving the call to services request from the client computing device 48 and retrieve object data associated with the webpage 12 from the data library 46 and/or business service servers 40 in response to the service calls. The client render module 72 then transmits the object data to the client computing device 48 for use in generating the rendered code for use in displaying the webpage 12.

In one embodiment, the client render module 72 is also configured to initiate a partial-render operation during the client render mode. During the partial-render operation, the client render module 72 retrieves the client rendering application code 62 from the data library and executes the client rendering application code 62 to identify the associated object data. The client render module 72 initiates the service calls to the data library 46 and/or business service servers 40 to retrieve the identified object data and transmits the client rendering application code 62 and the retrieved object data to the client computing device 48 to enable the client device to generate the rendered HTML code string.

For example, in one embodiment, the client render module 72 is configured to receive a request to display a webpage 12 on a client computing device, identify the client rendering application code 62 associated with the webpage, and initiate the partial-render operation including executing the application code to identify object data associated with the webpage. The client render module 72 also initiates service calls to a data library and/or the business service serves to retrieve the identified object data, and transmits the client rendering application code 62 and the identified object data to the client computing device for use in displaying the webpage on the client computing device. The client rendering application code 62 being transmitted to the client computing device 48 causes the client computing device 48 to execute the application code to generate HTML code using the object data. In one embodiment, the application code includes JavaScript instructions to generate the HTML code using the object data.

Figure 8A:
FIGS. 8A-8C are illustrations of exemplary server rendering application computer code generated by the system shown in FIGS. 1-2, according to embodiments of the present invention.
Figure 8B:
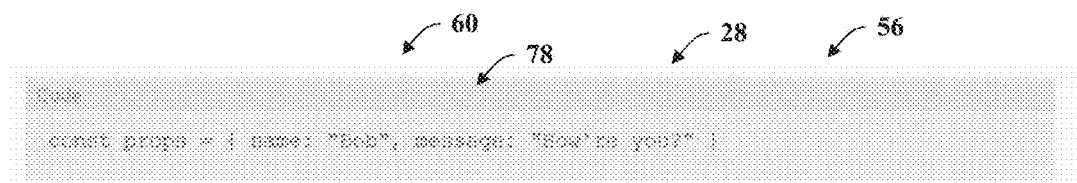
Figure 8C:
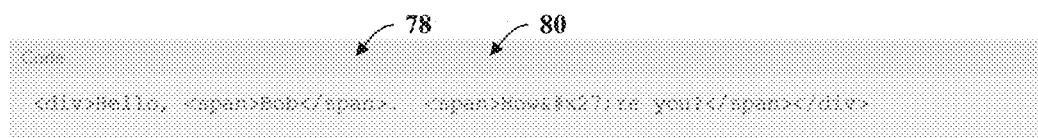
Figure 9A:
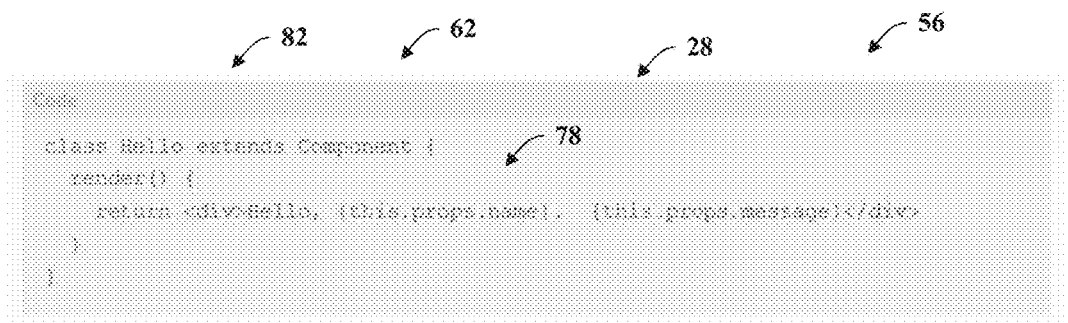
FIGS. 9A-9D are illustrations of exemplary client rendering application computer code generated by the system shown in FIGS. 1-2, according to embodiments of the present invention.
Figure 9B:
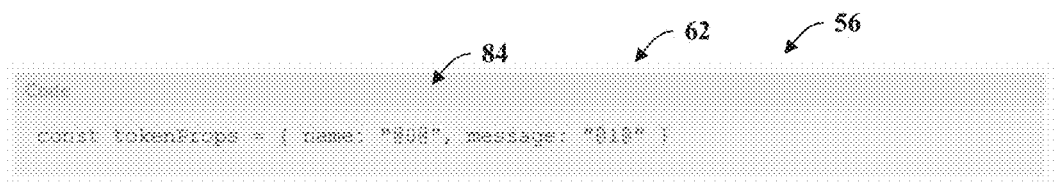
Figure 9C:
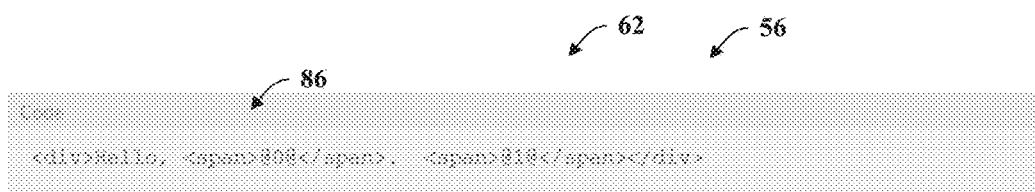
Figure 9D:
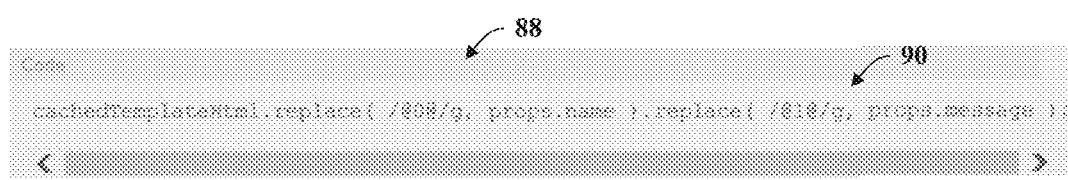

Referring to FIGS. 8A-8C, in one embodiment the server render module 70 may be configured to retrieve the server rendering application code 60 and execute a JSON.stringify on the software component's props, using the component code 28. The server render module 70 may then execute a render operation to request and receive the component props 78 (shown in FIG. 8B) from the data library 46, and generate the HTML code string 80 shown in FIG. 8C. The server render module 70 then transmits the HTML code string 80 to the client computing device 48.

In one embodiment, the client render module 72 may be configured to initiate the partial-render operation to execute the application code to generate partially-rendered application code including JavaScript instructions to generate the HTML code using the object data, and transmit the partially-rendered application code and the object data to the client computing device. For example, referring to FIGS. 9A-9D, in one embodiment, the client render module 72 may retrieve the client rendering application code 62 including template component code 82, shown in FIG. 9A. When executed by the client render module 72, the template component code 82 causes the client render module 72 to retrieve the component props 78, and replace the values in the props 78 with tokens 84 (shown in FIG. 9B), with @0@ referring to props.name and @1@ referring to props.message to generate the template HTML code 86 shown in FIG. 9C. In addition, the client render module 72 generates a lookup table 88, shown in FIG. 9D, which includes prop values 90 and corresponding tokens 84 that may be used to generate rendered code of the corresponding software component 14.

Figure 10A:
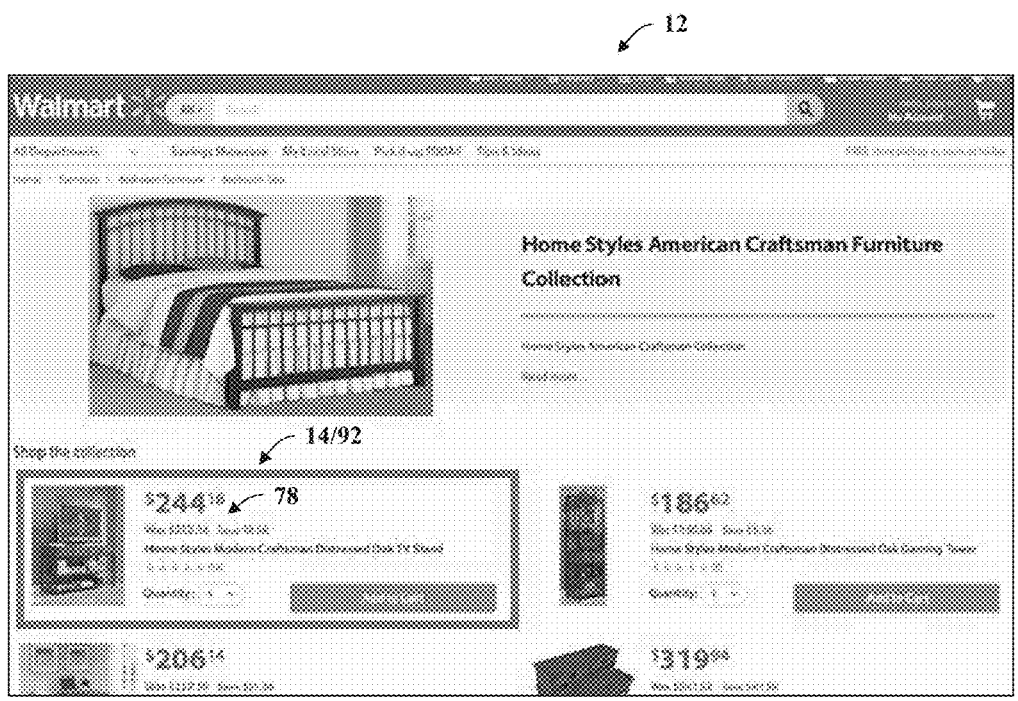
FIGS. 10A-10B are illustrations of an exemplary screenshot that may be generated by the system shown in FIGS. 1-2, according to embodiments of the present invention.
Figures 10B, 11:
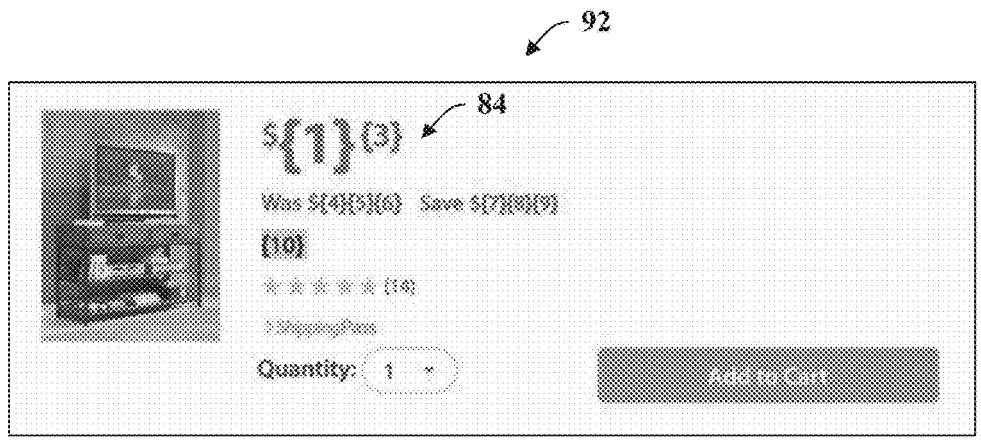
FIG. 11 is an illustration of exemplary client rendering application computer code generated by the system shown in FIGS. 1-2, according to embodiments of the present invention.

The client render module 72 may then transmit the template HTML code 86 and the lookup table 88 to the client computing device 48 including instructions for generated rendered HTML, code using the template HTML code 86 and the lookup table 88. For example, in one embodiment referring to FIGS. 10A-11, the client render module 72 may execute the template component code 82 to replace the prop values with special tokens instead of using the original props directly. For example, FIG. 10A illustrates a webpage 12 including a software component including a product card 92. The client render module 72 may generate template HTML code 86 by modifying the software component code to replace the prices and title props 78 with tokens 84 such as {1}, {2}, {3}, etc., to generate the template HTML code for a product card 92 that may look like the image shown in FIG. 10B. FIG. 11 illustrates a code sample that may be generated by the client render module 72 by turning a props 78 into a template. Note, that instead of using the string JSON paths as values in the template props, the client render module 72 uses one more indirection to have a lookup table 88 to refer back to the JSON path to get the original values 90 from props 78.

The server-client selection module 74 may also be configured to initiate the mix-mode render operation to render a portion of the webpage 12 using the server computer 64 and render another portion of the webpage 12 using the client computing device 48. For example, during the mix-mode render operation, the server-client selection module 74 instructs the server render module 70 to retrieve server rendering application code 60 that includes software component code 28 associated with the first webpage elements 30 being displayed in the above-the-fold area 34, and instruct the client render module 72 to retrieve client rendering application code 62 that includes software component code 28 associated with second webpage elements 32 being displayed outside of the above-the-fold area 34. The server render module 70 then executes a server render operation to render HTML code for the first webpage elements 30 and transmits the rendered HTML code to the client computing device 48. In addition, the client render module 72 initiates the client render operation to transmit the client rendering application code 62 to the client computing device 48 with instructions that cause the client computing device 48 to generate the rendered HTML code for the second webpage elements 32. In another embodiment, the client render module 72 may also initiate the partial-render operation during the mix-mode render operation.

In the illustrated embodiment, after the initial webpage has been rendered and displayed on the client computing device 48, the server computer 64 may receive a second request from the client computing device to modify the webpage. Upon receiving the second request, the server computer 64 is configured to identify a software component included in the application code based on the second request and generate a copy of the identified software component and modify the copy of the software component based on the second request to generate a modified copy of the identified software component. The server computer 64 may also initiate a re-render operation including executing the modified copy of the identified software component to identify object data associated with the modified copy of the identified software component. The server computer 64 may then initiate another service call to the data library to retrieve the object data associated with the modified copy of the identified software component, and transmit the modified copy of the identified software component and the retrieved object data to the client computing device for use in displaying the webpage on the client computing device.

In another embodiment, upon receiving the second request, the server computer 64 may be configured to generate a copy of the application code upon receiving the second request, and modify the copy of the application code to replace the identified software component with the modified copy of the software component to generate a modified copy of the application code. The server computer 64 may also initiate the re-render operation including executing the modified copy of the application code to identify and retrieve object data from the data library, and transmit the modified copy of the application code and the retrieved object data to the client computing device.

Figure 3:
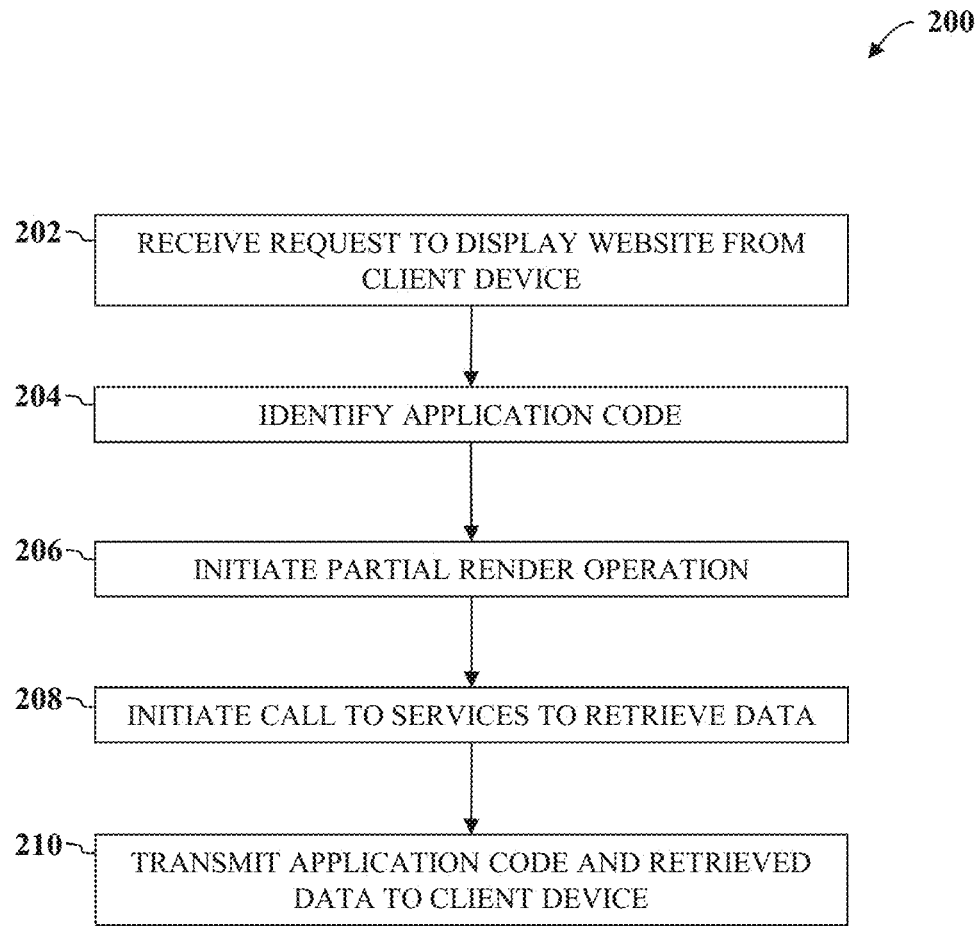
FIG. 3-5 are flowcharts of methods that may be used with the system shown in FIGS. 1-2, according to an embodiment of the present invention.
Figure 4:
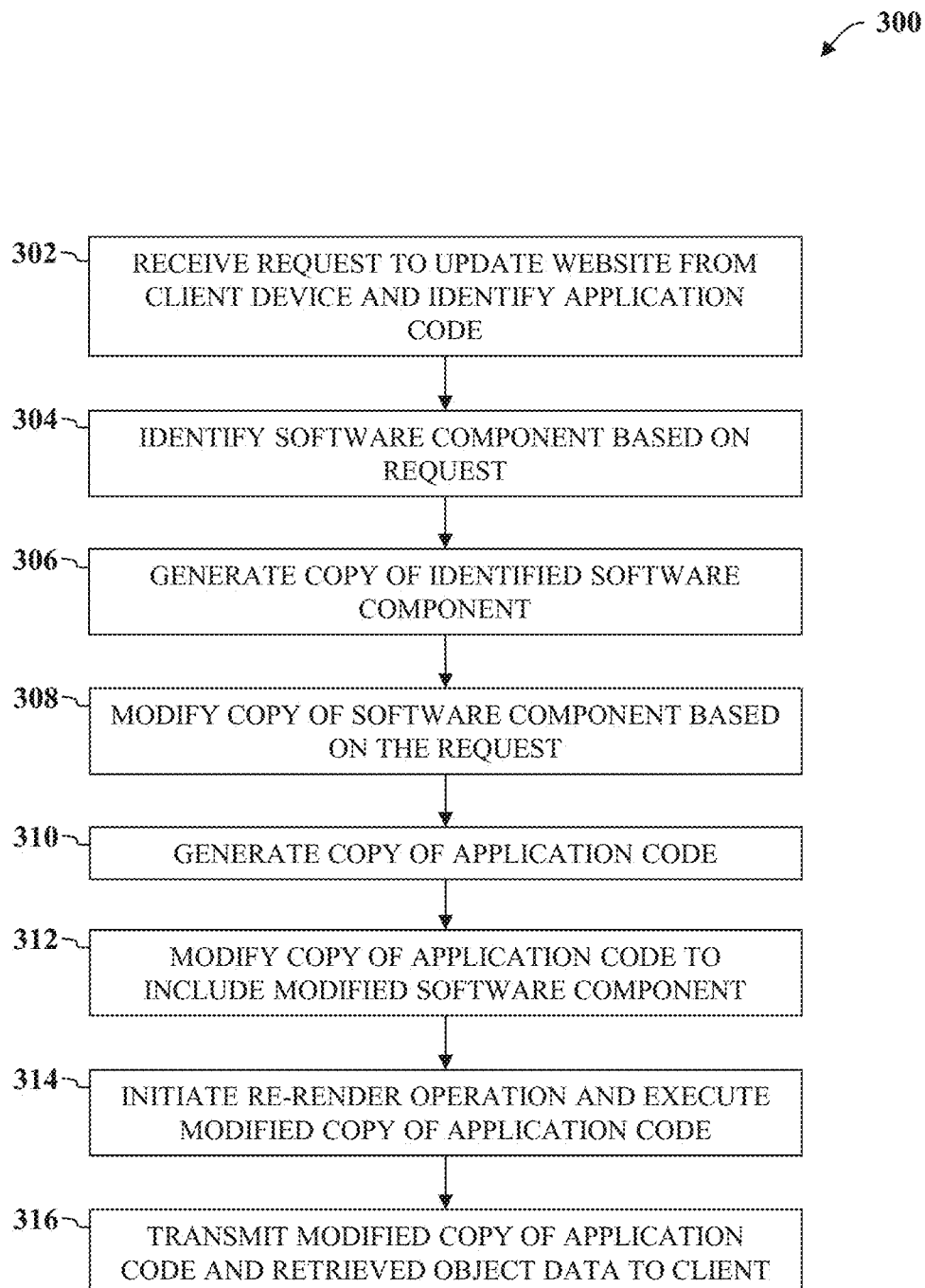
Figure 5:
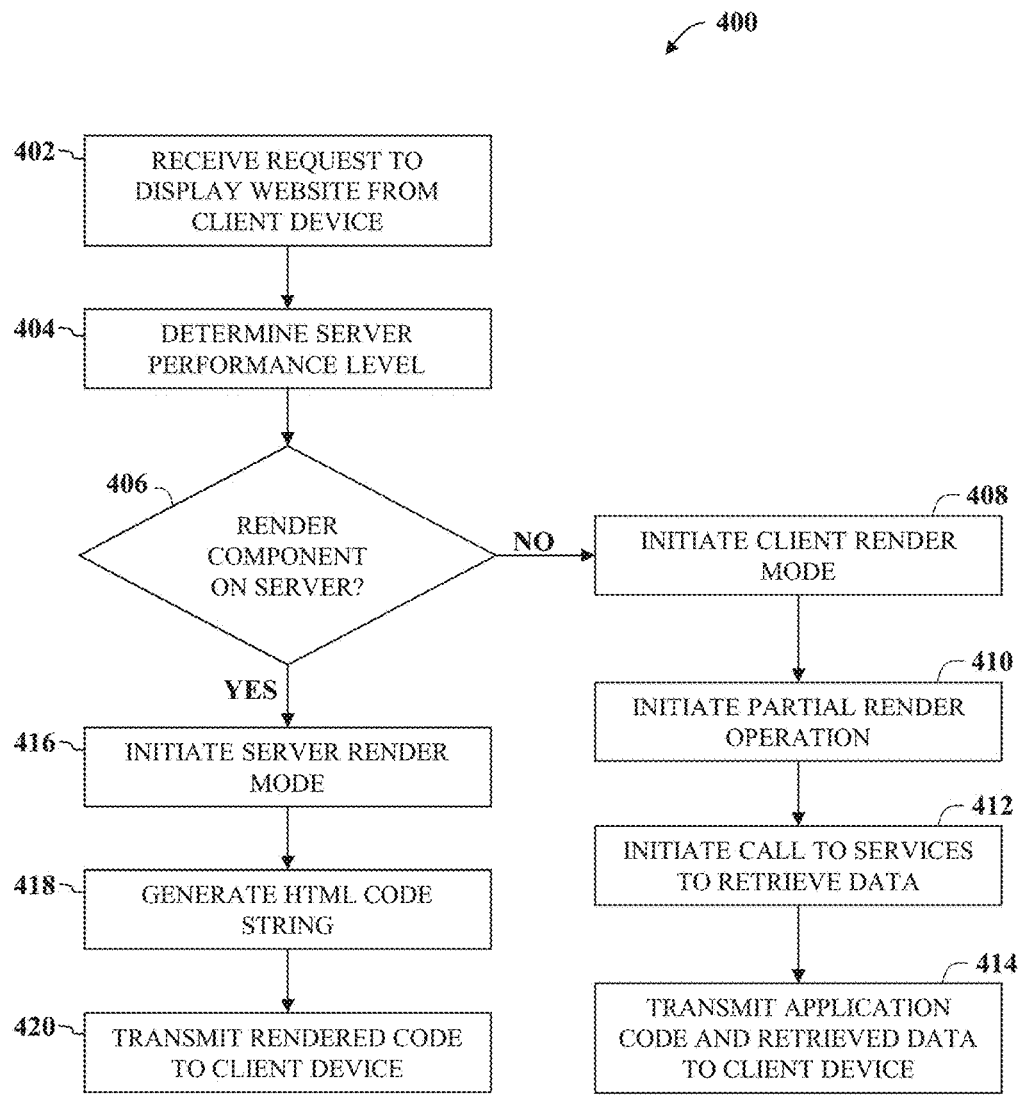

FIGS. 3-5 are flowcharts of methods 200, 300, and 400 that may be used to operate the system 10 to display a webpage on a client computing device. The method includes a plurality of steps. Each method step may be performed independently of, or in combination with, other method steps. Portions of the methods may be performed by any one of, or any combination of, the components of the system 10.

Referring to FIG. 3, in the illustrated embodiment, in method step 202, the server computer 64 receives a request from a client computing device 48 to display a webpage 12. For example, in one embodiment, the server computer 64 may receive a url request associated with the webpage 12 from the client computing device 48.

In method step 204, in response to receiving the request, the server computer 64 identifies application code associated with the webpage and accesses the component database library 46 and retrieves the application code that may be used to generate webpage 12.

In method step 206, the server computer 64 executes a partial-render operation including executing the application code to identify object data associated with the webpage.

In method step 208, the server computer 64 initiates service calls to the data library 46 and/or the business service servers 40 to retrieve the identified object data.

In method step 210, the server computer 64 transmits the application code and the identified object data to the client computing device 48 for use in displaying the webpage on the client computing device. In one embodiment, the application code transmitted to the client computing device causes the client computing device to execute the application code to generate HTML code using the object data. The application code may also include JavaScript instructions to generate the HTML code using the object data.

In one embodiment, the server computer 64 initiates the partial-render operation to execute the application code to generate partially-rendered application code including JavaScript instructions to generate the HTML code using the object data, and transmits the partially-rendered application code and the object data to the client computing device.

Referring to FIG. 4, in the illustrated embodiment, in method step 302, the server computer 64 receives a second request from the client computing device to modify the webpage 12 and identifies the application code associated with the webpage.

In method step 304, the server computer 64 retrieves the application code from the database library and identifies a software component included in the application code based on the second request.

In method step 306, the server computer 64 generates a copy of the identified software component.

In method step 308, the server computer 64 modifies the copy of the software component based on the second request to generate a modified copy of the identified software component.

In method step 310, the server computer 64 generates a copy of the application code upon receiving the second request.

In method step 312, the server computer 64 modifies the copy of the application code to replace the identified software component with the modified copy of the software component to generate a modified copy of the application code.

In method step 314, the server computer 64 initiates a re-render operation including executing the modified copy of the application code to identify and retrieve object data from the data library.

In method step 316, the server computer 64 transmits the modified copy of the application code and the retrieved object data to the client computing device 48 for use in rendering the modified application code to display the webpage including the changes requested by the user.

Referring to FIG. 5, in the illustrated embodiment, in method step 402, the server computer 64 receives a request from a client computing device 48 to display a webpage 12.

In method step 404, the server computer 64 determines a current performance level of the server computer 64 upon receiving the request from the client computing device 48. For example, in one embodiment, the server computer 64 monitors a plurality of performance indicators including a number of webpage requests being received, webpage uptime, CPU usage, CPU load, free disk space, and/or disk usage, and determines the current performance level of the website hosting server computer as a function of at least one of the performance indicators.

In method step 406, the server computer 64 determines whether to render the application code on the server computer 64. For example, the server computer 64 may be configured to operate in the client render mode upon determining the current performance level is less than a predefined performance level and initiate method step 408. In addition, the server computer 64 may determine to operate in the server render mode upon determining the current performance level is equal to the predefined performance level and initiate method step 416.

In method step 408, the server computer 64 operates in client render mode and retrieves the client rendering application code 62 from the data library.

In method step 410, the server computer 64 executes a partial-render operation including executing the client rendering application code 62 to identify object data associated with the webpage.

In method step 412, the server computer 64 initiates service calls to the data library 46 and/or the business service servers 40 to retrieve the identified object data.

In method step 414, the server computer 64 transmits the client rendering application code 62 and the identified object data to the client computing device 48 for use in displaying the webpage on the client computing device.

In method step 416, the server computer 64 operates in server render mode and retrieves the server rendering application code 60 from the data library 46.

In method step 418, the server computer 64 executes the server rendering application code 60 and initiates service calls to the data library 46 and/or business service servers 40 to retrieve the object data associated with the webpage, and executes a render-to-string operation to generate rendered HTML code.

In method step 420, the server computer 64 transmits the rendered HTML code to the client computing device for use in displaying the webpage.

In the illustrated embodiment, the server computer is configured to switch between the client render mode and the server render mode based on the monitored performance indicators. For example, when operating in server render mode, if an overutilization of server computer resources caused by an increase in the number of webpage requests is detected, the server computer may switch from server render mode to client render mode to reduce the computing resources being used by the server computer to render the HTML code, thus reducing the load on the server computer in supporting the website.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. In addition, a central processing unit (CPU) may include one or more processors as described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. One or more non-transitory computer-readable storage media, having computer-executable instructions embodied thereon, wherein when executed by at least one processor, the computer-executable instructions cause the at least one processor to:

receive, using a website hosting server computer, a request from a client computing device to display a webpage and transmit rendered code to the client computing device for use in displaying the webpage on the client computing device;

operate the website hosting server computer in a plurality of rendering modes including a server render mode and a client render mode, wherein the server render mode comprises the website hosting server computer: (a) retrieving server rendering application code associated with the webpage from a data library, (b) executing the server rendering application code to initiate service calls to the data library to retrieve object data associated with the webpage, (c) generating the rendered code including the object data, and (d) transmitting the rendered code to the client computing device, and wherein the client render mode comprises the website hosting server computer: (a) retrieving client rendering application code associated with the webpage from the data library and (b) transmitting the client rendering application code to the client computing device including instructions that cause the client computing device to generate the rendered code for use in displaying the webpage, the client rendering application code being different from the server rendering application code;

determine, using a monitoring server computer, a current performance level of the website hosting server computer;

transmit client render instructions from the monitoring server computer to the website hosting server computer upon determining the current performance level is less than a predefined performance level, the client render instructions cause the website hosting server computer to operate in the client render mode, wherein the client render mode further comprises:

receiving a call to services request from the client computing device;

initiating service calls to the data library upon receiving the call to services request;

retrieving second object data associated with the webpage; and transmitting the second object data to the client computing device for use in generating the rendered code for use in displaying the webpage; and transmit server render instructions from the monitoring server computer to the website hosting server computer upon determining the current performance level is equal to the predefined performance level, the server render instructions cause the website hosting server computer to operate in the server render mode.

2. The one or more non-transitory computer-readable storage media of claim 1, wherein the computer-executable instructions further cause the at least one processor to monitor, using the monitoring server computer, a plurality of performance indicators and determine the current performance level of the website hosting server computer as a function of at least one of the plurality of performance indicators.

3. The one or more non-transitory computer-readable storage media of claim 2, wherein the plurality of performance indicators comprises at least one of a number of webpage requests being received, webpage uptime, CPU usage, CPU load, free disk space, or disk usage.

4. The one or more non-transitory computer-readable storage media of claim 1, wherein the server render mode further comprises the website hosting server computer:

executing a render-to-string operation to generate rendered HTML code; and transmitting the rendered HTML code to the client computing device for use in displaying the webpage.

5. The one or more non-transitory computer-readable storage media of claim 1, wherein the client render mode further comprises the website hosting server computer:

initiating a partial-render operation including executing the client rendering application code to identify the second object data associated with the webpage.

6. The one or more non-transitory computer-readable storage media of claim 5, wherein the computer-executable instructions cause the at least one processor to:

initiate the partial-render operation to execute the client rendering application code to generate partially-rendered application code including JavaScript instructions to generate HTML code using the second object data; and transmit the partially-rendered application code and the second object data to the client computing device.

7. A computer-implemented method for operating a website hosting server computer system for use in displaying a webpage on a client computing device, including a server computer performing:

receiving a request from a client computing device to display the webpage and transmit rendered code to the client computing device for use in displaying the webpage on the client computing device;

operating in a plurality of rendering modes including a server render mode and a client render mode, wherein the server render mode comprises (a) retrieving server rendering application code associated with the webpage from a data library, (b) executing the server rendering application code to initiate service calls to the data library to retrieve object data associated with the webpage, (c) generating the rendered code including the object data, and (d) transmitting the rendered code to the client computing device, and wherein the client render mode comprises (a) retrieving client rendering application code associated with the webpage from the data library and (b) transmitting the client rendering application code to the client computing device including instructions that cause the client computing device to generate the rendered code for use in displaying the webpage, the client rendering application code being different from the server rendering application code; and determining a current performance level of the server computer;

operating in the client render mode upon determining the current performance level is less than a predefined performance level, wherein the client render mode further comprises:

receiving a call to services request from the client computing device;

initiating service calls to the data library upon receiving the call to services request;

retrieving second object data associated with the webpage; and transmitting the second object data to the client computing device for use in generating the rendered code for use in displaying the webpage; and operating in the server render mode upon determining the current performance level is equal to the predefined performance level.

8. The computer-implemented method of claim 7, further comprising monitoring a plurality of performance indicators and determining the current performance level of the website hosting server computer system as a function of at least one of the plurality of performance indicators.

9. The computer-implemented method of claim 8, wherein the plurality of performance indicators comprises at least one of a number of webpage requests being received, webpage uptime, CPU usage, CPU load, free disk space, or disk usage.

10. The computer-implemented method of claim 7, wherein, the operating in the server render mode further comprising executing a render-to-string operation to generate rendered HTML code and transmitting the rendered HTML code to the client computing device for use in displaying the webpage.

11. The computer-implemented method of claim 7, wherein, the operating in the client render mode including:
    initiating a partial-render operation including executing the client rendering application code to identify the second object data associated with the webpage.

12. The computer-implemented method of claim 11, further comprising:
    initiating the partial-render operation to execute the client rendering application code to generate partially-rendered application code including JavaScript instructions to generate HTML code using the second object data; and
    transmitting the partially-rendered application code and the second object data to the client computing device.

13. A system for use in displaying a webpage, comprising:
    a client computing device including a display device, a memory device, and a processor coupled to the memory device, the memory device including a web-browser program being stored therein, the processor configured to execute the web-browser program to display the webpage on the display device;
    a website hosting server computer configured to:
        receive a request from the client computing device to display the webpage and transmit rendered code to the client computing device for use in displaying the webpage on the client computing device; and
        operate in a plurality of rendering modes including a server render mode and a client render mode, wherein the server render mode comprises (a) retrieving server rendering application code associated with the webpage from a data library, (b) executing the server rendering application code to initiate service calls to the data library to retrieve object data associated with the webpage, (c) generating the rendered code including the object data, and (d) transmitting the rendered code to the client computing device, and wherein the client render mode comprises (a) retrieving client rendering application code associated with the webpage from the data library and (b) transmitting the client rendering application code to the client computing device including instructions that cause the client computing device to generate the rendered code for use in displaying the webpage, the client rendering application code being different from the server rendering application code; and
    a monitoring server computer configured to:
        determine a current performance level of the website hosting server computer;
        transmit client render instructions to the website hosting server computer upon determining the current performance level is less than a predefined performance level, the client render instructions cause the website hosting server computer to operate in the client render mode, wherein the client computing device is configured to execute the received client rendering application code and transmit a call to services request to the website hosting server computer, the website hosting server computer initiates service calls to the data library upon receiving the call to services request, retrieves second object data associated with the webpage, and transmits the second object data to the client computing device for use in generating the rendered code for use in displaying the webpage; and
        transmit server render instructions to the website hosting server computer upon determining the current performance level is equal to the predefined performance level, the server render instructions cause the website hosting server computer to operate in the server render mode.

14. The system of claim 13, wherein the monitoring server computer is further configured to monitor a plurality of performance indicators and determine the current performance level of the website hosting server computer as a function of at least one of the plurality of performance indicators.

15. The system of claim 14, wherein the plurality of performance indicators comprises at least one of a number of webpage requests being received, webpage uptime, CPU usage, CPU load, free disk space, or disk usage.

16. The system of claim 13, wherein the website hosting server computer operates in the server render mode including executing a render-to-string operation to generate rendered HTML code and transmitting the rendered HTML code to the client computing device for use in displaying the webpage.

17. The system of claim 13, wherein the website hosting server computer is configured to operate in the client render mode including:
    initiating a partial-render operation including executing the client rendering application code to identify second object data associated with the webpage;
    generate partially-rendered application code including JavaScript instructions to generate HTML code using the second object data; and
    transmitting the partially-rendered application code and the second object data to the client computing device.

* * * * *